United States Patent
Jenkins

(10) Patent No.: US 11,133,927 B1
(45) Date of Patent: Sep. 28, 2021

(54) MOVING TARGET DEFENSE FOR A SERIAL COMMUNICATIONS SYSTEM

(71) Applicant: National Technology & Engineering Solutions of Sandia, LLC, Albuquerque, NM (US)

(72) Inventor: Christopher D. Jenkins, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 468 days.

(21) Appl. No.: 16/353,039

(22) Filed: Mar. 14, 2019

(51) Int. Cl.
| | |
|---|---|
| *H04L 9/08* | (2006.01) |
| *G06F 13/42* | (2006.01) |
| *G06F 13/16* | (2006.01) |
| *G06F 21/60* | (2013.01) |
| *H04L 29/06* | (2006.01) |
| *G06F 7/58* | (2006.01) |

(52) U.S. Cl.
CPC .......... *H04L 9/085* (2013.01); *G06F 13/1668* (2013.01); *G06F 13/4282* (2013.01); *G06F 21/602* (2013.01); *H04L 63/0428* (2013.01); *G06F 7/582* (2013.01); *H04L 2209/08* (2013.01)

(58) Field of Classification Search
CPC ... H04L 9/085; H04L 9/0869; H04L 63/0428; H04L 2208/08; G06F 21/60; G06F 21/602; G06F 21/604; G06F 21/85; G06F 13/1668; G06F 13/4282; G06F 7/582
See application file for complete search history.

(56) References Cited

U.S. PATENT DOCUMENTS

| | | | |
|---|---|---|---|
| 7,607,167 B1 | 10/2009 | Johnson et al. | |
| 2010/0192217 A1 | 7/2010 | Arnold | |
| 2013/0254442 A1* | 9/2013 | Robillard | ................ G06F 21/85 710/107 |
| 2015/0020152 A1* | 1/2015 | Litichever | ............. G06F 21/604 726/1 |
| 2015/0096006 A1 | 4/2015 | Chu et al. | |
| 2016/0065612 A1 | 3/2016 | Evans et al. | |
| 2018/0167365 A1 | 6/2018 | Zarcone | |

(Continued)

OTHER PUBLICATIONS

Stan et al., Protecting Military Avionics Platforms from Attacks on MIL-STD-1553 Communication Bus, 2017.*

(Continued)

*Primary Examiner* — Minh Dinh
(74) *Attorney, Agent, or Firm* — Madelynne J. Farber

(57) ABSTRACT

A moving target defense scheme for a serial communications system is disclosed herein. A bus controller generates and broadcasts a nonce to remote terminals over a bus. The bus controller and the remote terminals generate a randomized sequence based upon the nonce and a shared secret that is shared between the bus controller and the remote terminals. The bus controller broadcasts first messages over the bus on first addresses that are derived from first portions of the randomized sequence. The remote terminals listen for the first messages that are broadcast over the bus on the first addresses. The bus controller broadcasts a shift message that causes the remote terminals to listen for second messages that are broadcast over the bus on second addresses that are derived from second portions of the randomized sequence.

20 Claims, 8 Drawing Sheets

(56) References Cited

U.S. PATENT DOCUMENTS

2018/0307845 A1 10/2018 Eckhardt et al.
2020/0267171 A1* 8/2020 Mozumdar ............ G06N 20/00

OTHER PUBLICATIONS

Hossain-Mckenzie, et al., "Performance-Based Cyber Resilience Metrics: An Applied Demonstration Toward Moving Target Defense", In IECON 2018—44th Annual Conference of the IEEE Industrial Electronics Society, 2018, pp. 766-773.

* cited by examiner

MOVING TARGET DEFENSE FOR A SERIAL COMMUNICATIONS SYSTEM

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

A serial communications system is a system in which data is sent bit-by-bit, in sequence, over a bus. Due to their transmissions speeds and signal integrity, serial communications systems are increasingly used for communicating data both within a device (e.g., a computing device), as well as communicating data between devices (e.g., a computing device and a printer).

An exemplary serial communications system comprises a bus controller that is in communication with a plurality of remote terminals by way of a bus. The bus controller broadcasts messages over the bus—when a message is intended for a particular remote terminal, the message includes an address of the remote terminal. Thus, each remote terminal "listens" for messages that include the address of the remote terminal, and the remote terminal in the plurality of remote terminals responds to a message only when the message comprises an address of the remote terminal. In contrast to Internet Protocol (IP) based systems (e.g., IPv4 or IPv6) which have a relatively large number of available addresses, the number of available addresses in a serial communications system is relatively small.

Conventionally, each remote terminal within the serial communications system trusts all messages broadcast over the bus. As some serial communications systems do not support authentication or encryption of messages broadcast over the bus, this can present a security risk if an outside actor gains control of the bus controller or a remote terminal. For instance, a remote terminal or the bus controller may become infected with malware, which causes the remote terminal or the bus controller to issue malicious commands over the bus. Devices listening on the bus assume that the commands originated from a trusted source. Conventional security approaches for the serial communications system tend to focus on anomaly detection within the serial communications system, which tends to require reconfiguration of the serial communications system.

SUMMARY

The following is a brief summary of subject matter that is described in greater detail herein. This summary is not intended to be limiting as to the scope of the claims.

Described herein are various technologies pertaining to a moving target defense (MTD) scheme for a serial communications system. More specifically, described herein is a serial communications system that is configured to generate a randomized sequence that is used to derive addresses for remote terminals comprised by the serial communications system, such that the addresses of the remote terminals unpredictably change from the perspective of an observer that is not a trusted member of the serial communications system.

A serial communications system comprises a first remote terminal, a second remote terminal, and a bus controller that are in communication by way of a bus. The first remote terminal, the second remote terminal, and the bus controller are provisioned with a shared secret. The shared secret is provisioned without broadcasting the shared secret over the bus. For instance, the shared secret may be provisioned to the first remote terminal, the second remote terminal, and the bus controller offline prior to operation of the serial communications system.

The bus controller generates a nonce and broadcasts the nonce over the bus. The bus controller also generates a randomized sequence by applying a cryptographic function to a combination of the nonce and the shared secret. For instance, the bus controller may append the nonce to the shared secret to form a bit sequence, and then generate the randomized sequence by way of a pseudo-random number generator (PRNG) that takes the bit sequence as input and outputs the randomized sequence.

The first remote terminal and the second remote terminal receive the nonce broadcast by the bus controller over the bus. Both the first remote terminal and the second remote terminal generate the same randomized sequence as has been generated by the bus controller, wherein the first remote terminal and the second remote terminal generate the randomized sequence based upon the nonce and the shared secret. The first remote terminal and the second remote terminal derive addresses for themselves (a first address and a second address, respectively) based upon a first portion of the randomized sequence and a second portion of the randomized sequence. The first portion and the second portion of the randomized sequence may be initially assigned to the first remote terminal and the second remote terminal, respectively. The first remote terminal and the second remote terminal then begin to listen for messages broadcast over the bus by the bus controller on the first address and the second address, respectively.

The bus controller also derives the first address and the second address for the first remote terminal and the second remote terminal, respectively, based upon the first portion of the randomized sequence and the second portion of the randomized sequence. The bus controller then begins to broadcast messages over the bus using these new addresses for the remote terminals (i.e., a message intended for the first remote terminal includes the first address while a message intended for the second remote terminal includes the second address). In an example, the bus controller broadcasts a message over the bus that comprises the first address. As such, the first remote terminal receives the message and responds to the message (e.g., by performing an action indicated by the message, by broadcasting a second message, etc.). The second remote terminal receives the message over the bus but does not respond to the message as the message does not comprise the second address.

Sometime subsequent to deriving the first address and the second address, the bus controller generates a shift message and broadcasts the shift message over the bus. The shift message causes the first remote terminal and the second remote terminal to simultaneously change their addresses based upon the randomized sequence referenced above. For instance, the shift message may cause the first remote terminal and the second remote terminal to assign themselves a third address and a fourth address, respectively, such that the first remote terminal begins listening for messages on the bus that have the third address and the second remote terminal begins listening for message on the bus that have and fourth address. The first remote terminal derives the third address using a third portion of the randomized sequence, wherein the first remote terminal shifts from the first portion of the randomized sequence to the third portion of the randomized sequence based upon the shift message broadcast by the bus controller. Similarly, the second remote terminal derives the fourth address from a fourth portion of the randomized sequence, wherein the second remote terminal shifts from the second portion of the randomized sequence to the fourth portion of the randomized sequence based upon the shift message broadcast by the bus controller. The bus controller may then begin to broadcast messages over the bus using the new addresses.

The above-described technologies present various improvements over conventional serial communications systems. First, the above-described technologies improve security of serial communications systems. More specifically, even if an outside actor gained access to a bus of a serial communications system, the MTD scheme described above prevents the outside actor from generating coherent messages that can be broadcast along the bus. Second, the above-described technologies maintain functionality and real time operation of the serial communications system without requiring extensive reconfiguration of the serial communications system. Additionally, the above-described technologies are useful in industrial control systems and in avionics systems, such avionics systems that conform to a MIL-STD-1553 standard.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
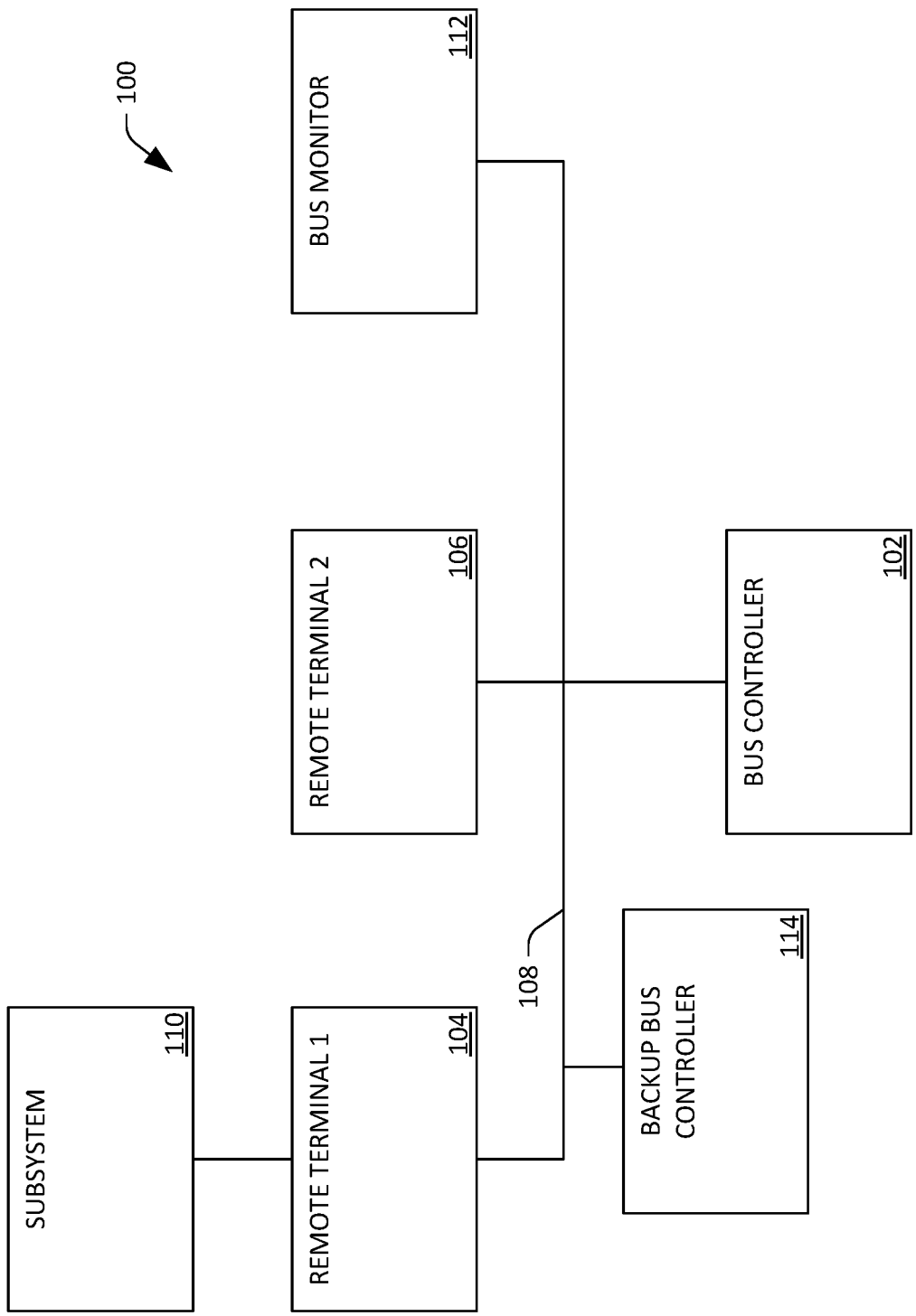
FIG. 1 is a functional block diagram of an exemplary serial communications system.

Various technologies pertaining to a moving target defense (MTD) scheme for a serial communications system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference to FIG. 1, an exemplary serial communications system 100 is illustrated. In an embodiment, the serial communications system 100 may operate according to the MIL-STD-1553 standard; however, it is to be understood that the serial communications system 100 need not be limited to the MIL-STD-1553 standard. The serial communications system 100 includes a bus controller 102. As will be described in greater detail below, the bus controller 102 is generally configured to receive messages from remote terminals and transmit message to the remote terminals in the serial communications system 100.

The serial communications system 100 also includes a first remote terminal 104 and a second remote terminal 106. The first remote terminal 104 and the second remote terminal 106 are in communication with the bus controller 102 by way of a bus 108. As will be described in greater detail below, the first remote terminal 104 and the second remote terminal 106 are configured to receive and transmit messages over the bus 108.

The first remote terminal 104 and/or the second remote terminal 106 may be in communication with one or more subsystems. For instance, in the serial communications system 100 shown in FIG. 1, the first remote terminal 104 is in communication with a subsystem 110. The first remote terminal 104 may be embedded within the subsystem 110. In an example, the subsystem 110 may be a display subsystem.

In an exemplary embodiment, the first remote terminal 104 and the second remote terminal 106 are unable to directly communicate with one another. As such, the first remote terminal 104 and the second remote terminal 106 utilize the bus controller 102 to act as an intermediary in order to exchange messages between the first remote terminal 104 and the second remote terminal 106. Hence, the bus controller 102 receives all messages sent over the bus 108 by the remote terminals and then transmits messages back out onto the bus 108 to the remote terminals The serial communications system 100 optionally comprises a bus monitor 112 that is coupled to the bus 108. The bus monitor 112 is configured to observe and record messages broadcast over the bus 108, and potentially perform analysis for malicious activities. The serial communications system 100 may further optionally comprise a backup bus controller 114. In the event of failure of the bus controller 102 or a loss of functionality of the bus controller 102, the backup bus controller 114 is configured to assume responsibilities of the bus controller 102. When the backup bus controller 114 assumes responsibilities of the bus controller 102, the backup bus controller 114 is in communication with the first remote terminal 104 and the second remote terminal 106 by way of the bus 108.

Although the serial communications system 100 is depicted as including a first remote terminal 104 and a second remote terminal 106, it is to be understood that the serial communications system 100 may include more than two remote terminals (i.e., a plurality of remote terminals). Furthermore, it is to be understood that some of the remote terminals in the plurality of remote terminals need not participate in the MTD scheme that is described in greater detail below. Additionally, it is to be understood that the bus controller 102, the first remote terminal 104, and the second remote terminal 106 may be in communication by one or more redundant buses (not shown in FIG. 1) in addition to the bus 108.

Figure 2:
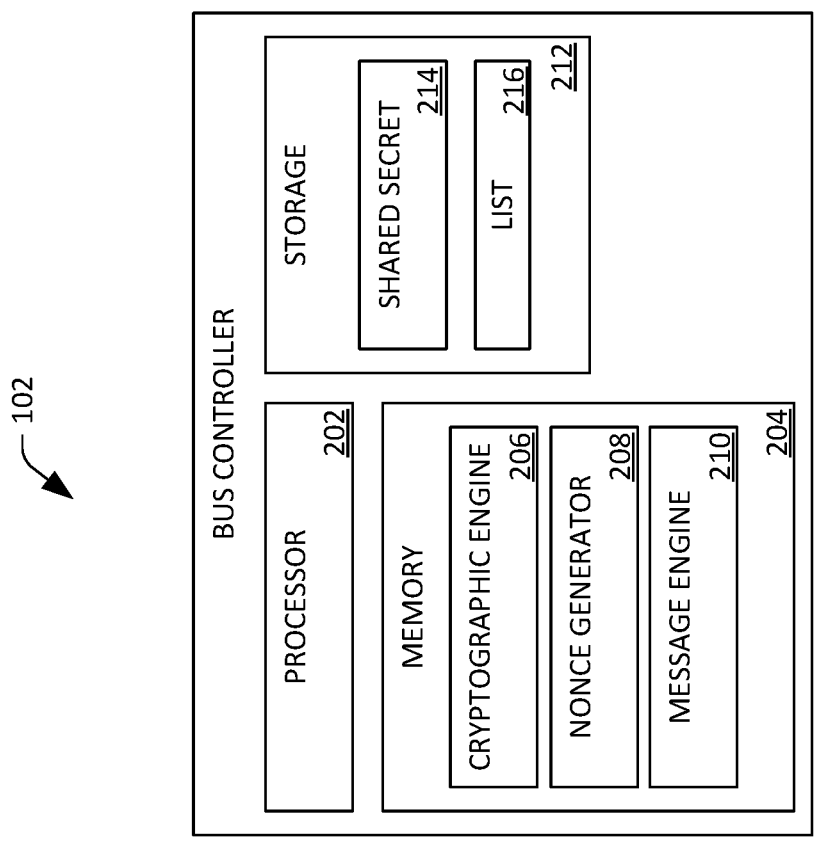
FIG. 2 is a functional block diagram of an exemplary bus controller.

Referring now to FIG. 2, a functional block diagram of the bus controller 102 is illustrated. The bus controller 102 includes a processor 202 and memory 204, wherein the memory 204 includes a cryptographic engine 206. As will be described in greater detail below, the cryptographic engine 206 (when executed by the processor 202) is configured to generate a randomized sequence (or pseudorandomized sequence) that is used by the bus controller 102 to derive addresses for remote terminals. The memory 204 comprises a nonce generator 208 that (when executed by the processor 202) is configured to generate a nonce that is used by the cryptographic engine 206 in generating the randomized sequence. The memory 206 further includes a message engine 210. The message engine 210 (when executed by the processor 202) is configured to generate and transmit messages to remote terminals. The message engine 210 (when executed by the processor 202) is also configured to receive messages from the remote terminals. The message engine 210 is further configured to facilitate transmission of messages between remote terminals.

In an embodiment, a message generated by the bus controller 102 includes an address for a remote terminal (e.g., the first remote terminal 104, the second remote terminal 106, etc.) and data that is to be consumed by the remote terminal. In an example, the data in the message may indicate that the remote terminal is to perform an action in response to receipt of the message.

The bus controller 102 further includes storage 212, wherein the storage 212 may be secure storage (such as a portion of a trusted platform module (TPM)) of the bus controller 102. The storage 212 stores a shared secret 214 that is shared between the bus controller 102 and remote terminals (e.g., the first remote terminal 104, the second remote terminal 106, etc.). The shared secret 214 is provisioned to the bus controller 102 without being broadcast over the bus 108. For instance, the shared secret 214 may be provisioned offline to the bus controller 102. In a non-limiting example, the shared secret 214 may be placed in the storage 212 by coupling removable storage to a port of the bus controller 102 and transferring the shared secret 214 from the removable storage to the storage 212.

In an embodiment, some remote terminals in a serial communications system may not participate in the MTD scheme described below. For instance, the serial communications system 100 may include a third remote terminal (not shown) that does not participate in the MTD scheme (and hence the shared secret 214 is not shared with the third remote terminal). As such, the storage 212 stores a list 216 of participating and nonparticipating remote terminals. The list 216 comprises identifiers (i.e., static addresses) for the remote terminals and indications as to which remote terminals participate/do not participate in the MTD scheme. When the bus controller 102 broadcasts a message to the third remote terminal, the bus controller 102 may utilize a static address for the third terminal to broadcast the message.

While the bus controller 102 is illustrated in FIG. 2 as including a processor and memory, other implementations are also contemplated. For instance, the bus controller 102 may be implemented in hardware, such that the bus controller 102 is an application specific integrated circuit (ASIC). In another example, the bus controller 102 may be or include a hardware logic module, such as a field programmable gate array (FPGA).

Figure 3:
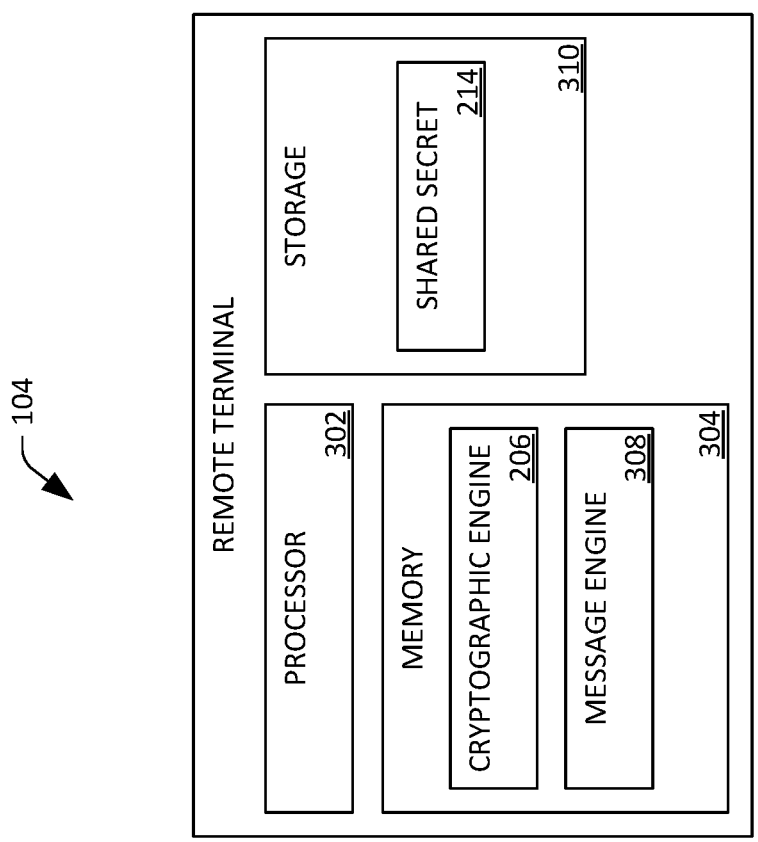
FIG. 3 is a functional block diagram of an exemplary remote terminal.

With reference now to FIG. 3, a functional block diagram of the first remote terminal 104 is illustrated. It is to be understood that the second remote terminal 106 can be configured similarly to the first remote terminal 104. The first remote terminal 104 includes a processor 302 and memory 304. The memory 304 includes the cryptographic engine 206, which is configured to generate the randomized sequence (or pseudorandomized sequence) referenced above. The memory 304 also includes a message engine 308. Similar to the message engine 210, the message engine 308 (when executed by the processor 302) is configured to generate, transmit, and receive messages. The first remote terminal 104 further includes storage 310. In an embodiment, the storage 310 may be part of a TPM of the first remote terminal 104. The storage 310 stores the shared secret 214 referenced above, wherein the shared secret 214 can be placed in the storage 310 of the remote terminal 104 without placing the shared secret 214 on the bus 108. While the first remote terminal 104 is depicted as including a processor and memory, it is to be understood that the first remote terminal 104 may be an ASIC or some other suitable hardware logic module.

With reference generally now to FIGS. 1-3, operation of the serial communications system 100 is now set forth. The shared secret 214 is provisioned to each of the bus controller 102, the first remote terminal 104, and the second remote terminal 106 without exposing the shared secret 214 on the bus 108. The nonce generator 208 of the bus controller 102 generates a nonce (e.g., the nonce generator can be a random number generator that generates a random number of predefined length), and the bus controller 102 broadcasts the nonce over the bus 108. The cryptographic engine 206 of the bus controller then generates a randomized sequence based upon the nonce and the shared secret 214. More specifically, the cryptographic engine 206 may generate the randomized sequence by appending the shared secret and the nonce together to form a sequence, and then applying a cryptographic function over the sequence to form the randomized sequence. For instance, the cryptographic engine 206 can generate the randomized sequence through use of the cryptographic function, such as a pseudo-random number generator (PRNG) that takes the sequence as input and outputs the randomized sequence. The PRNG may utilize modular arithmetic, keyed-hash message authentication codes (HMACs), stream ciphers, block ciphers, and linear-feedback shift registers (LFSR) in order to generate the randomized sequence.

The first remote terminal 104 and the second remote terminal 106 receive the nonce broadcast over the bus 108 by the bus controller 102. The cryptographic engine 206 of the first remote terminal 104 generates the randomized sequence based upon the nonce and the shared secret 214—thus, the first remote terminal 104 has generated the same randomized sequence as the bus controller 102. The second remote terminal 106 also generates the randomized sequence based upon the nonce and shared secret 214. Thus, each of the bus controller 102, the first remote terminal 104, and the second remote terminal 106 generates and stores the randomized sequence, without exposing the randomized sequence over the bus 108.

The randomized sequence comprises a sequence of bytes. In an example, the randomized sequence (when viewed in hexadecimal format) may be "b613679a0814d9ec772f95d778c35ff1697c4937." The bus controller 102 can initially assign different portions of the randomized sequence to different devices in the system 100, including itself. Therefore, no two devices are assigned the same portion of the randomized sequence. Further, the different portions of the randomized sequence are unique, such that no two portions of the randomized sequence include the same values. For instance, the bus controller 102 can assign a first portion of the randomized sequence to the first remote terminal 104, the bus controller can assign a second portion of the randomized sequence to the second remote terminal 106, and the bus controller 102 can assign a third portion of the randomized sequence to itself. In some embodiments, the bus controller 102 may have an inherent address and hence in these embodiments, the bus controller 102 does not assign the third portion of the randomized sequence to itself. In an exemplary embodiment, the bus controller 102 can transmit a message to the first remote terminal 104, wherein the message identifies the first portion of the randomized sequence that is assigned to the first remote terminal 104 and the third portion of the randomized sequence that is assigned to the bus controller 102 (and optionally identifies the second portion of the randomized sequence that is assigned to the second remote terminal 106). Additionally, the bus controller 102 can transmit a message to the second remote terminal 106, wherein the message identifies the second portion of the randomized sequence that is assigned to the second remote terminal 106 and the third portion of the randomized sequence that is assigned to the bus controller 102 (and optionally identifies the first portion of the randomized sequence that is assigned to the first remote terminal 104).

The bus controller 102 can derive addresses for each device in the communication system that participates in the MTD scheme based upon the randomized sequence and the portions of the randomized sequence that are respectively assigned to the devices in the system 100. More specifically, the bus controller 102 derives a first address for the first remote terminal 104 based upon the first portion of the randomized sequence assigned to the first remote terminal 104. The bus controller 102 additionally derives a second address for the second remote terminal 106 based upon the second portion of the randomized sequence assigned to the second remote terminal 106. The bus controller 102 additionally derives a third address for the bus controller 102 based upon the third portion of the randomized sequence assigned to the bus controller 102. An exemplary derivation process is set forth below in FIG. 4. Responsive to deriving the addresses for the devices, the bus controller 102 can broadcast messages over the bus 108 that include such addresses.

The first remote terminal 104 derives the first address for the first remote terminal 104 and the third address for the bus controller 102 (and optionally the second address for the second remote terminal 106) based upon the message received from the bus controller 102. Likewise, the second remote terminal derives the second address for the second remote terminal 106 and the third address for the bus controller 102 (and optionally the first address for the first remote terminal 104) based upon the message received from the bus controller 102. Thus, the bus controller 102 can determine derived addresses of all devices in the communications system 100, and other devices in the communications system have knowledge of at least their own derived address as well as the derived address of the bus controller 102. In an exemplary embodiment, the bus controller 102 and the remote terminals 104 and 106 can each maintain a list of static addresses of other devices in the system 100.

Immediately responsive to the bus controller 102 transmitting the messages to the first remote terminal 104 and the second remote terminal 106 (where the messages assign the different portions of the randomized sequence to the remote terminals 104 and 106), the bus controller 102 can transmit messages over the bus 108 utilizing the derived addresses. Thus, the bus controller 102 can generate a first message for the first remote terminal 104 that includes the first address and place such message on the bus 108 and can generate a second message for the second remote terminal 106 that includes the second address and place such message on the bus 108. The remote terminals 104 and 106, which have independently derived their own addresses, can listen for messages that include the derived addresses. Thus, the first remote terminal 104 can accept the first message (since the first message includes the first address and the first remote terminal 104 has derived the first address for itself). Similarly, the second remote terminal 106 can accept the second message (since the second message includes the second address and the second remote terminal 106 has derived the second address for itself). The first and second remote terminals 104 and 106 can include the third address in messages intended for the bus controller 102. In an exemplary embodiment, the first terminal 104 can generate a message intended for the second remote terminal 106, wherein the message can include a static address for the second remote terminal 106. The bus controller 102 receives the message and identifies the second (derived) address for the second remote terminal (as the bus controller 102 has knowledge of the static addresses of the devices on the bus 108 as well as the derived addresses described above). The bus controller 102 can place the second address in the message and broadcast the message onto the bus 108, whereupon the second remote terminal 106 consumes the message (as the message includes the second derived address). Alternatively, the first remote terminal 104 can have knowledge of the second portion of the randomized sequence assigned to the second remote terminal 106, can derive the second address, and can include the second address in the message intended for the second remote terminal 106. The bus controller 102 receives the message and broadcasts the message on the bus 108 (where the message includes the second address), whereupon it is consumed by the second remote terminal 106.

The bus controller 102, from time to time, can change the portions of the randomized sequence that are assigned to the devices in the system 100, and can therefore cause the addresses of the devices to change. For example, the bus controller 102 can broadcast a shift message over the bus 108 that is to be consumed by all devices on the bus 108. The shift message updates the portions of the randomized sequence assigned to the devices, and thus updates the addresses assigned to the devices. For instance, the first remote terminal 104 may initially be assigned portion N of the randomized sequence, and the shift message indicates that each device is to shift their assigned portion by two. Accordingly, the first remote terminal 104 can ascertain that it is assigned portion N+2 of the randomized sequence (and each other device can also shift its assigned portion of the randomized sequence by two). The first remote terminal 104 can derive its new address based upon portion N+2 of the randomized sequence. In the scenario where a shift would result in a device being assigned a portion that exceeds the randomized sequence, a "wrap-around" can occur. For instance, if the randomized sequence consists of portions 1-M, and if the first remote terminal 104 is currently assigned portion M, and further if the shift message indicates that the first terminal 104 is to be assigned its current portion of the randomized sequence shifted by three portions, then the first remote terminal 104 can be assigned portion 2 of the randomized sequence. The first remote terminal 104 can then derive its address based upon portion 2 of the randomized sequence.

The bus controller 102 may be configured to broadcast the shift message after a defined amount of time has elapsed from the bus controller 102 broadcasting a most recent shift message. In another example, the bus controller 102 can be configured to broadcast shift messages at randomized time intervals.

Further, to assist in avoiding pattern detection, the bus controller 102 may periodically generate a new nonce and broadcast the new nonce over the bus 108, which causes the devices participating in the MTD scheme to generate a new randomized sequence. As described above, the devices are assigned to different portions of the new randomized sequence and addresses for the devices are derived based upon these newly-assigned portions of the new randomized sequence.

In another exemplary embodiment, the bus controller 102, the first remote terminal 104, and the second remote terminal 106 may be synchronized, and can shift the portions of the randomized sequence (by some pre-specified shift number) at predefined time intervals. In such an embodiment, the devices on the bus 108 can update their addresses without requiring the bus controller 102 to broadcast a shift message.

Further, in some serialized communications protocols, messages can include identifiers for actions that are to be performed by the message recipients. The above-described processes may also be used to randomize these identifiers.

Figure 4:
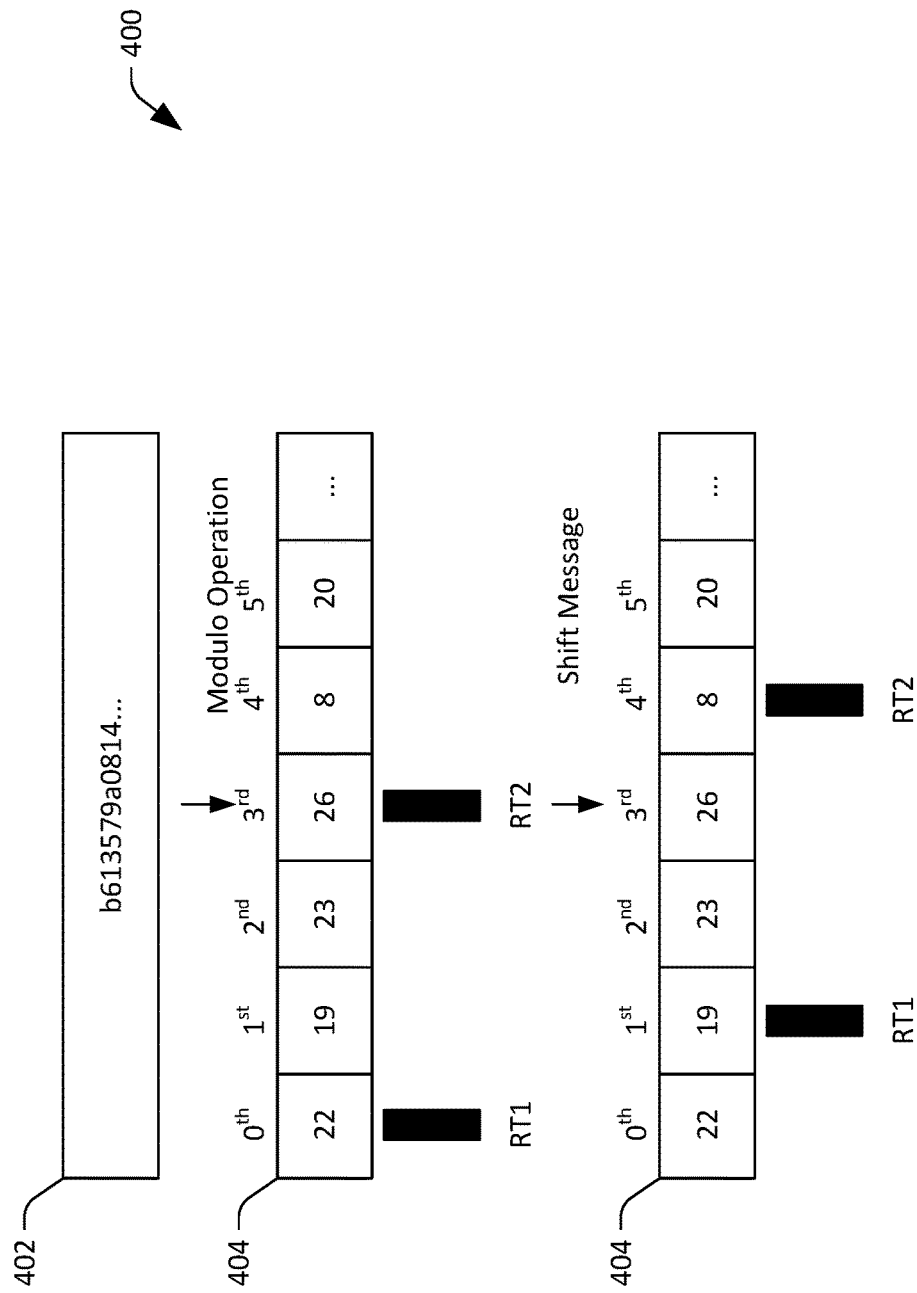
FIG. 4 is a schematic that illustrates derivation of addresses for devices in a serial communications system.

Turning now to FIG. 4, a schematic 400 that depicts derivations of addresses for devices in a serial communications system (e.g., the serial communications system 100) is shown. The schematic 400 includes a randomized sequence 402 ("b613579a0814 . . . ") that is generated by the bus controller 102 and the remote terminals 104 and 106 by applying a cryptographic function to the nonce and the shared secret 214 that is shared between the bus controller 102 and the remote terminals 104-1-6. The randomized sequence 402 comprises bytes that are depicted in hexadecimal form in FIG. 4.

In the example shown in the schematic 400, the serial communications system is able to include 32 devices. As such, the bus controller 102 and the remote terminals 104 and 106 may perform a modulo N operation on each byte in the randomized sequence to generate an array 404 of values, where N is equal to the number of devices in the serial communications system. For instance, the bus controller 102 and the remote terminals 104-106 may perform a modulo 32 operation on a byte "b6" (equivalent to 182 in decimal format) to generate a value of 22 at portion 0 of the array 404. For clarity, the schematic 400 only depicts values found at portions 0-5 of the array 404. In an embodiment, the array 404 may be a circular linked list.

The bus controller 102 can verify that each value of each portion in the array 404 is unique. If the bus controller 102 determines that a value at a portion in the array 404 is repeated, the bus controller 102 may replace the value at the portion with some other value that is not found within the array 404.

The first remote terminal 104 (shown as "RT1" in FIG. 4) is (initially) assigned to portion 0 of the array 404, the second remote terminal 106 (shown as "RT2" in FIG. 4) is (initially) assigned to portion 3 of the array 404. Each of the values in the portions of the array 404 can be an address itself or can be an index to an address. For purposes of explanation, the values in the portions of the array 404 are described below as being addresses. Thus, the first remote terminal 104 listens for messages broadcast over the bus 108 by the bus controller 102 that include the address 22 (which is included in portion 0 of the array 404). The second remote terminal 106 listens for messages broadcast over the bus 108 by the bus controller 102 that include the address 26 (which is included in portion 3 of the array 404).

When the bus controller 102 broadcasts a shift message, the bus controller 102 and the remote terminals 104 and 106 shift assignment of portions of the array 404. For instance, as shown in FIG. 4, when the shift message indicates to "shift one right," the first remote terminal 104 and the second remote terminal 106 are reassigned to portions that are located one portion to the right of their previously assigned portion. Thus, after receiving the shift message, the first remote terminal 104 is reassigned to portion 1 of the array 404 and the second remote terminal 106 is reassigned to portion 4 of the array 404. The first remote terminal 104 listens for messages broadcast over the bus 108 by the bus controller 102 that include the address 19 (which is included in portion 1 of the array 404). The second remote terminal 106 listens for messages broadcast over the bus 108 by the bus controller 102 that include the address 8 (which is included in portion 4 of the array 404).

It is to be understood that different shift messages are contemplated. In an example, rather than receiving the "shift right one" message, if the shift message instructs to "shift left one," the first remote terminal 104 is reassigned to an address in portion 31 of the array 404 (not shown in FIG. 4) and the second remote terminal 106 is reassigned to an address in portion 2 of the array 404.

When the bus controller 102 broadcasts a reset message, addresses for the remote terminals revert to their initial assignments. In the example shown in FIG. 4, when the bus controller 102 broadcasts the reset message, the first remote terminal 104 is reassigned to the address (22) at portion 0 of the array 404 and the second remote terminal 106 is reassigned to the address (26) at portion 3 of the array 404.

Although the above-described processes have been described as being executed by the serial communications system 100 comprising the bus controller 102, the first remote terminal 104, and the second remote terminal 106, it is to be understood that the above-described processes are applicable to many different serial communications systems, including serial communications systems comprising different device types and serial communications systems that are described using different nomenclatures. Furthermore, it is to be understood that the above-described processes may be used in a serial communications system that has more than two remote terminals.

Figure 5:
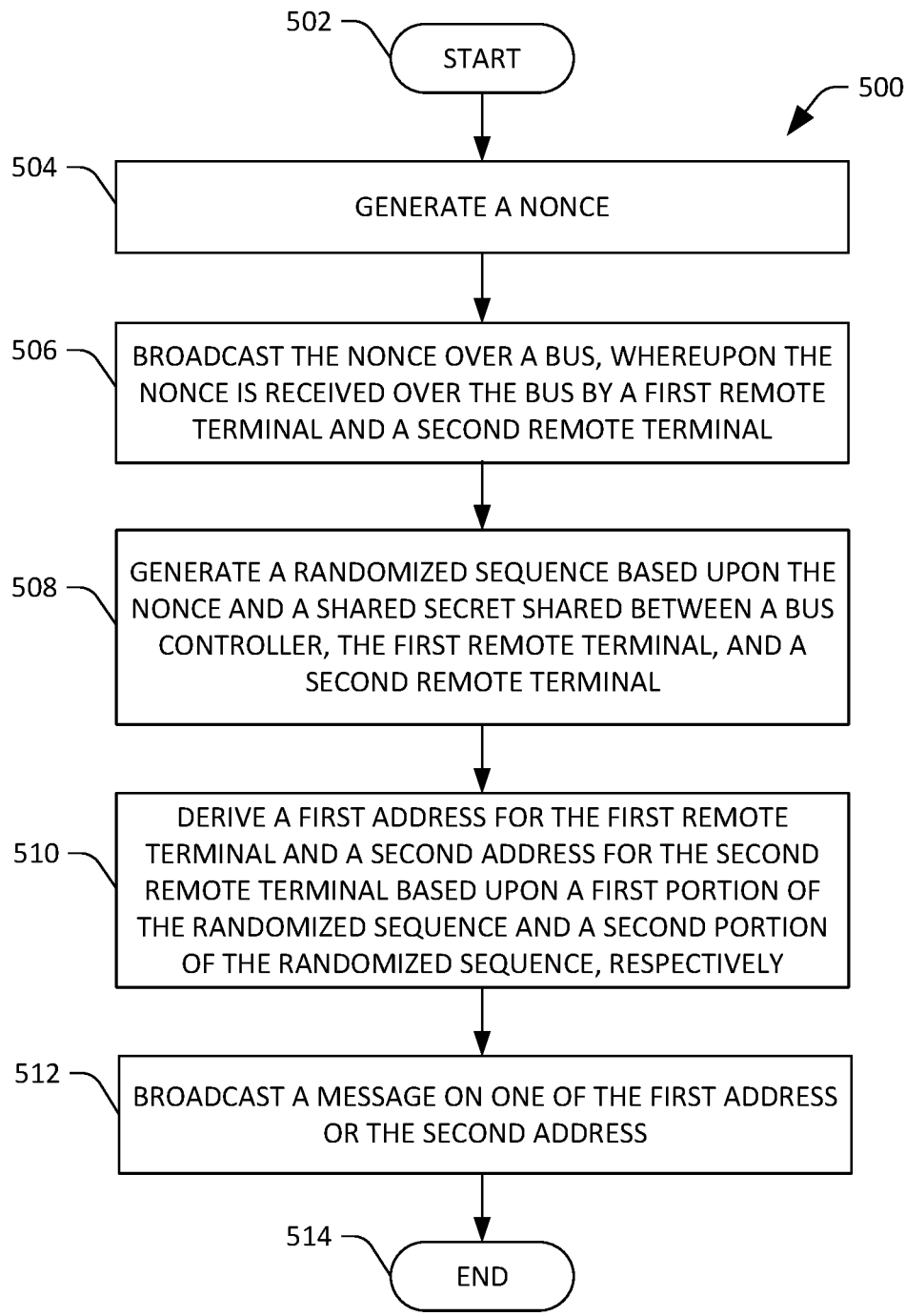
FIG. 5 is a flow diagram that illustrates an exemplary methodology performed by a bus controller for protecting communications broadcast in a serial communications system.
Figure 6:
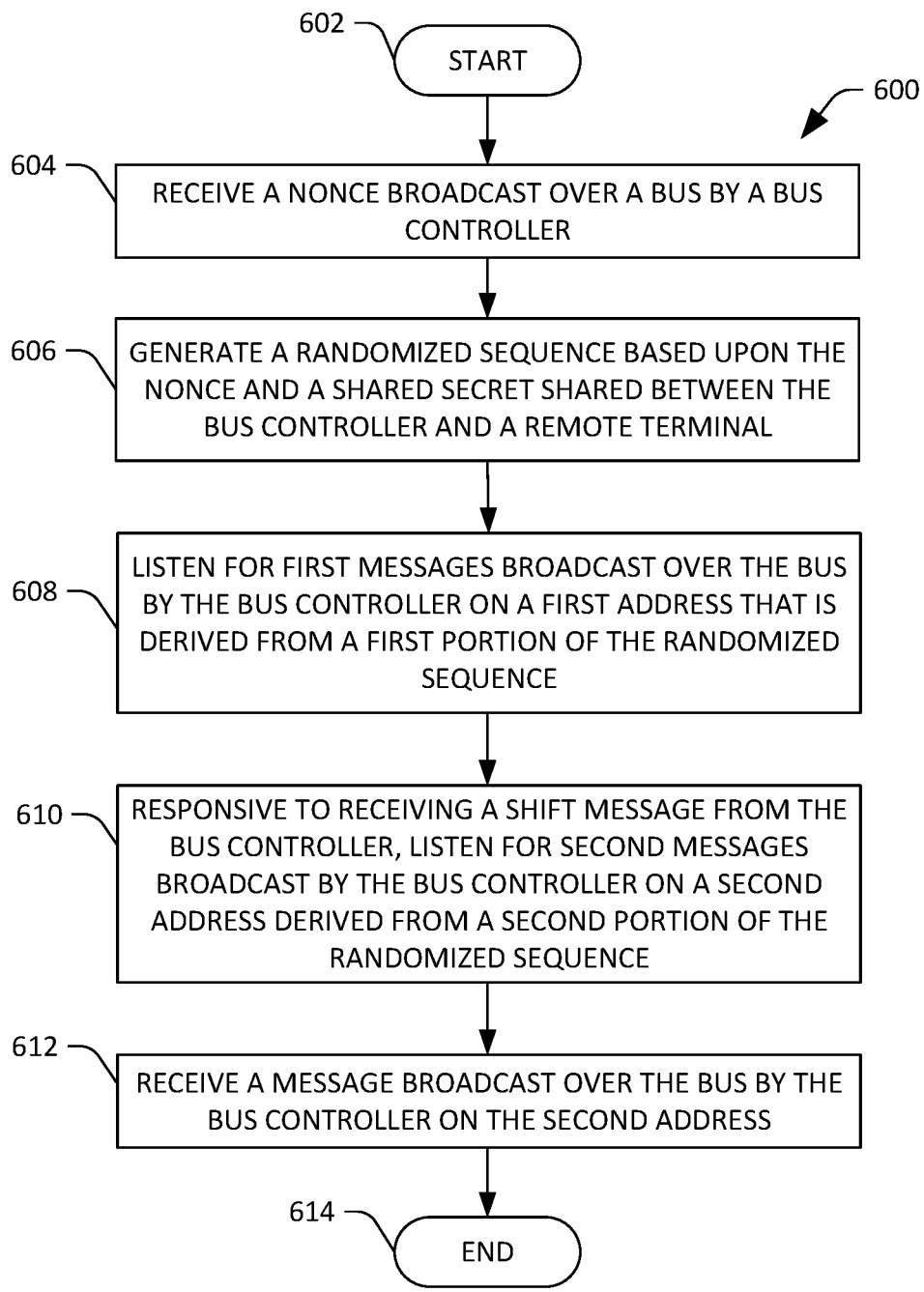
FIG. 6 is a flow diagram that illustrates an exemplary methodology performed by a remote terminal for protecting communications broadcast in a serial communications system.
Figure 7:
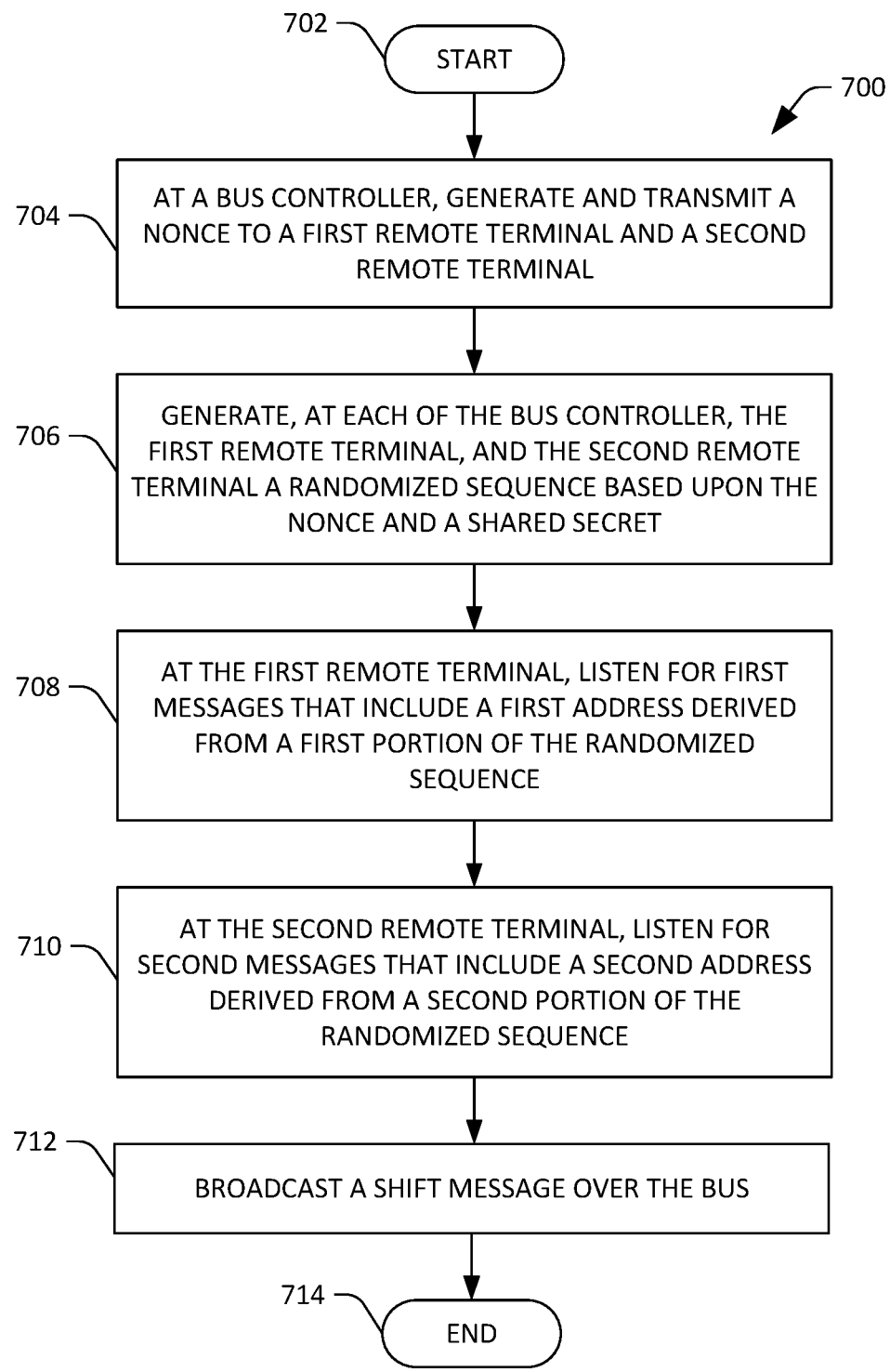
FIG. 7 is a flow diagram that illustrates an exemplary methodology performed by a serial communications system for protecting communications broadcast in the serial communications system.

FIGS. 5-7 illustrate exemplary methodologies relating to an MTD scheme for serial communications systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 executed by a bus controller that facilitates protecting communications in a serial communications system is illustrated. The methodology 500 begins at 502, and at 504, the bus controller generates a nonce. At 506, the bus controller broadcasts the nonce over a bus, whereupon the nonce is received over the bus by a first remote terminal and a second remote terminal. At 508, the bus controller generates a randomized sequence based upon the nonce and a shared secret that is shared between the bus controller, the first remote terminal, and the second remote terminal. At 510, the bus controller derives a first address for the first remote terminal and a second address for the second remote terminal. The first address is based upon a first portion of the randomized sequence and the second address is based upon a second portion of the randomized sequence. At 512, the bus controller broadcasts a message on one of the first address or the second address. The methodology 500 concludes at 514.

Turning now to FIG. 6, a methodology 600 executed by a remote terminal that facilitates protecting communications in a serial communications system is illustrated. The methodology 600 begins at 602, and at 604, the remote terminal receives a nonce that is broadcast over a bus by a bus controller. At 606, the remote terminal generates a randomized sequence based upon the nonce and a shared secret that is shared between the bus controller and the remote terminal. At 608, the remote terminal listens for first messages broadcast by the bus controller over the bus on a first address that is derived from a first portion of the randomized sequence. At 610, responsive to receiving a shift message broadcast over the bus by the bus controller, the remote terminal listens for second messages broadcast over the bus by the bus controller on a second address that is derived from a second portion of the randomized sequence. At 612, the remote terminal receives a message broadcast over the bus by the bus controller on the second address. The methodology 600 concludes at 614.

Referring now to FIG. 7, a methodology 700 executed by a serial communications system that facilitates protecting communications within the serial communications system is illustrated. The methodology 700 begins at 702, and at 704, a bus controller generates a nonce and transmits the nonce to a first remote terminal and a second remote terminal. At 706, each of the bus controller, the first remote terminal, and the second remote terminal generates a randomized sequence based upon the nonce and a shared secret that is shared between the first remote terminal, the second remote terminal, and the bus controller.

At 708, the first remote terminal listens for first messages broadcast over the bus that include a first address. The first address is derived from a first portion of the randomized sequence. At 710, concurrently with the first remote terminal listening for the first messages, the second remote terminal listens for second messages broadcast over the bus that include a second address. The second address is derived from a second portion of the randomized sequence. At 712, the bus controller broadcasts a shift message over the bus. The shift message causes the first remote terminal to listen for third messages broadcast over the bus that include a third address, wherein the third address is derived from a third portion of the randomized sequence. The shift message also causes the second remote terminal to listen for fourth messages broadcast over the bus that include a fourth address, wherein the fourth address is derived from a fourth portion of the randomized sequence. The methodology 700 concludes at 714.

Figure 8:
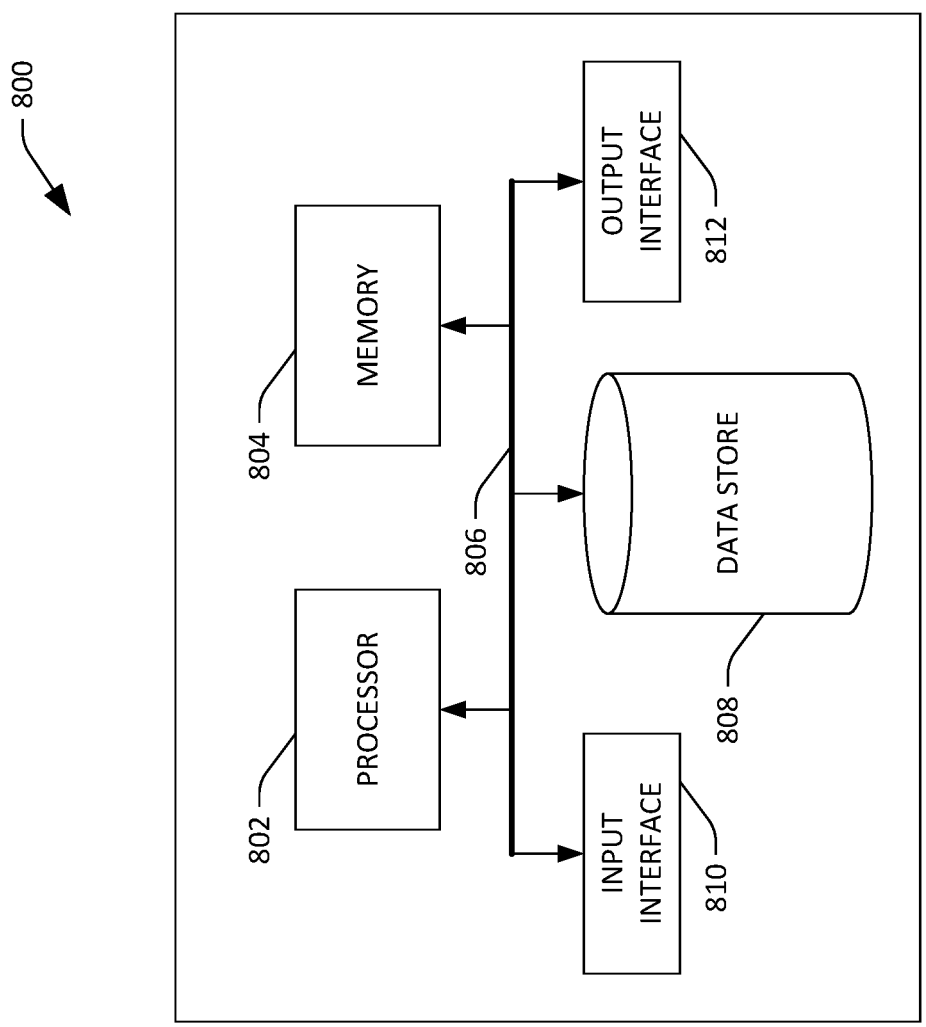
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that listens for messages on addresses that are derived from portions of a randomized sequence. By way of another example, the computing device 800 can be used in a system that generates a randomized sequence based upon a nonce and a shared secret. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store shared secrets, shared keys, messages, lists of remote terminals participating in an MTD scheme, etc.

The computing device 800 additionally includes a data store 808 that is accessible by the processor 802 by way of the system bus 806. The data store 808 may include executable instructions, shared secretes, shared keys, messages, lists of remote terminals participating in an MTD scheme, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A serial communications system comprising:
   a first remote terminal;
   a second remote terminal; and
   a bus controller, wherein the first remote terminal, the second remote terminal, and the bus controller are in communication by way of a bus of the serial communication system, wherein the first remote terminal and the second remote terminal are configured to:
   generate a randomized sequence based upon a nonce and a shared secret that is shared between the first remote terminal, the second remote terminal, and the bus controller; and
   listen for messages broadcast over the bus by the bus controller on addresses that are derived from portions of the randomized sequence, wherein the bus controller is configured to:
   generate the nonce;
   broadcast the nonce over the bus to the first remote terminal and the second remote terminal;
   generate the randomized sequence based upon the nonce and the shared secret; and
   broadcast the messages over the bus on the addresses that are derived from the portions of the randomized sequence.

2. The serial communications system of claim 1, further comprising:
   a bus monitor that is configured to record the messages that are broadcast by the bus controller over the bus on the addresses that are derived from the portions of the randomized sequence.

3. The serial communications system of claim 1, wherein a message in the messages comprises an address for one of the first remote terminal or the second remote terminal and an indication of an action that is to be performed by the first remote terminal or the second remote terminal.

4. The serial communications system of claim 1, wherein the serial communications system operates according to the MIL-STD-1553 standard.

5. The serial communications system of claim 1, wherein the shared secret is provisioned to the first remote terminal, the second remote terminal, and the bus controller without broadcasting the shared secret over the bus.

6. The serial communications system of claim 1, wherein the first remote terminal, the second remote terminal, and the bus controller generate the randomized sequence by applying a cryptographic function to a combination of the nonce and the shared secret.

7. The serial communications system of claim 6, wherein the cryptographic function is a pseudo-random number generator (PRNG).

8. The serial communications system of claim 1, wherein the bus controller is further configured to:
   broadcast a shift message over the bus, wherein the shift message causes the first remote terminal and the second remote terminal to listen for messages broadcast by the bus controller on second addresses that are derived from second portions of the randomized sequence.

9. The serial communications system of claim 1, wherein the bus controller broadcasts a first message over the bus, wherein the first message includes a first address for the first remote terminal, wherein the first remote terminal broadcasts a second message over the bus responsive to receiving the first message.

10. The serial communications system of claim 1, wherein the first remote terminal is in communication with a subsystem of the serial communications system, wherein the first remote terminal receives a message broadcast over the bus by the bus controller on an address in the addresses, wherein the first remote terminal causes the subsystem to perform an action based upon the message.

11. The serial communications systems of claim 1, wherein the randomized sequence comprises bytes, wherein the serial communications system comprises N remote terminals, where N is a positive integer greater than 1, wherein each of the first remote terminal, the second remote terminal, and the bus controller apply a modulo N operation to each byte in the bytes, thereby generating an array comprising the addresses, wherein a first portion of the array is initially assigned to the first remote terminal, wherein a first address of the first remote terminal is located at the first portion, wherein the first remote terminal listens for first messages broadcast by the bus controller over the bus that include first address, wherein a second portion of the array is initially assigned to the second remote terminal, wherein a second address of the second remote terminal is located at the second portion, wherein the second remote terminal listens for second messages broadcast by the bus controller that include the second address.

12. The serial communications system of claim 11, wherein the bus controller is further configured to broadcast a shift message over the bus, wherein the shift message causes the first remote terminal to listen for third messages broadcast by the bus controller that include a third address located at a third portion in the array, wherein the shift messages causes the second remote terminal to listen for fourth messages broadcast by the bus controller over the bus that include a fourth address located at a fourth portion in the array.

13. A method executed by a serial communications system comprising a first remote terminal, a second remote terminal, and a bus controller that are in communication by way of a bus, the method comprising:
   at the bus controller, generating a nonce and transmitting the nonce to the first remote terminal and the second remote terminal;
   at each of the first remote terminal, the second remote terminal, and the bus controller, generating a randomized sequence based upon the nonce and a shared secret that is shared between the first remote terminal, the second remote terminal, and the bus controller;
   at the first remote terminal, listening for first messages broadcast by the bus controller over the bus that include a first address, wherein the first address is derived from a first portion of the randomized sequence;
   concurrently with the first remote terminal listing for the first messages, at the second remote terminal, listening for second messages broadcast by the bus controller over the bus that include a second address, wherein the second address is derived from a second portion of the randomized sequence; and
   at the bus controller, broadcasting a shift message over the bus, wherein the shift message causes the first remote terminal to listen for third messages broadcast over the bus by the bus controller that include a third address and further causes the second remote terminal to listen for fourth messages broadcast by the bus controller that include a fourth address, wherein the third address is derived from a third portion of the randomized sequence and the fourth address is derived from a fourth portion of the randomized sequence.

14. The method of claim 13, wherein the third address is the second address, wherein the fourth address is the first address.

15. The method of claim 13, wherein the shared secret is provisioned to the first remote terminal, the second remote terminal, and the bus controller without broadcasting the shared secret over the bus.

16. The method of claim 13, wherein the shift message is broadcast over the bus after an amount of time has elapsed from causing the first remote terminal to listen for the first messages.

17. The method of claim 16, wherein the amount of time is randomized.

18. The method of claim 13, further comprising:
   at the bus controller, generating and transmitting a second nonce to the first remote terminal and the second remote terminal;
   at the bus controller, the first remote terminal, and the second remote terminal, generating a second randomized sequence based upon the second nonce and the shared secret;
   at the first remote terminal, listening for fifth messages broadcast over the bus by the bus controller that include a fifth address that is derived from a first portion of the second randomized sequence; and
   at the second remote terminal, listening for sixth messages broadcast over the bus by the bus controller that include a sixth address that is derived from a second portion of the second randomized sequence.

19. A first remote terminal that is in communication with a second remote terminal and a bus controller by way of a bus in a serial communications system, the first remote terminal comprising:
   storage comprising a shared secret that is shared between the first remote terminal, the second remote terminal, and the bus controller in the serial communications system, wherein the first remote terminal is configured to perform acts comprising:
      receiving a nonce broadcast over the bus by the bus controller;
      generating a randomized sequence based upon the nonce and the shared secret;
      listening for first messages broadcast by the bus controller over the bus on a first address that is derived from a first portion of the randomized sequence; and
      responsive to receiving a shift message broadcast over the bus by the bus controller, listening for second messages broadcast by the bus controller over the bus on a second address that is derived from a second portion of the randomized sequence.

20. The remote terminal of claim 19, the acts further comprising:
   responsive to receiving a message broadcast over the bus by the bus controller on the second address, executing an action based upon the message.

* * * * *